United States Patent [19]

Tamura

[11] 4,129,201
[45] Dec. 12, 1978

[54] BRAKE FOR VEHICLES

[75] Inventor: Yoshitaka Tamura, Ohtone, Japan

[73] Assignee: Bridgestone Cycle Co., Ltd., Japan

[21] Appl. No.: 820,896

[22] Filed: Aug. 1, 1977

[30] Foreign Application Priority Data

Oct. 29, 1976 [JP] Japan .................. 51-129340

[51] Int. Cl.$^2$ ............................................. F16D 49/16
[52] U.S. Cl. ................................................... 188/76
[58] Field of Search ............ 188/2 D, 18 R, 26, 72.9, 188/76; 192/73

[56] References Cited
U.S. PATENT DOCUMENTS

| 788,464 | 4/1905 | Green ............................... 188/76 |
| 1,040,515 | 10/1912 | Cooper ............................ 188/76 |
| 3,422,932 | 1/1969 | Wilson et al. ................. 188/72.2 |

Primary Examiner—Duane A. Reger
Attorney, Agent, or Firm—Stevens, Davis, Miller & Mosher

[57] ABSTRACT

A brake for vehicles comprises a brake drum rotating with a wheel, an inner pin fixed to a vehicle body within the brake drum, an inner shoe whose end is pivotally supported by the pin, an arm formed integrally with the inner shoe and extending outwardly beyond the brake drum, an outer pin extending from the end of the arm, an outer shoe pivotally supported by the outer pin and adapted to be in contact with the outer periphery of the brake drum, and actuating means for urging the inner and outer shoes toward and away from the brake drum, whereby a braking force acting upon on one shoe helps the braking action of the other shoe to provide a sufficient braking force by a slight brake operating force.

10 Claims, 8 Drawing Figures

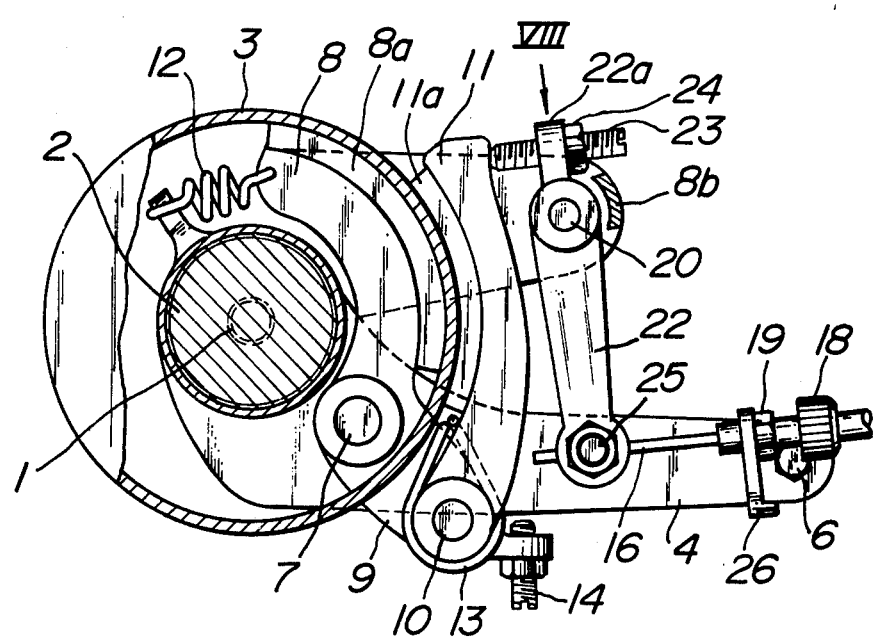
FIG_7
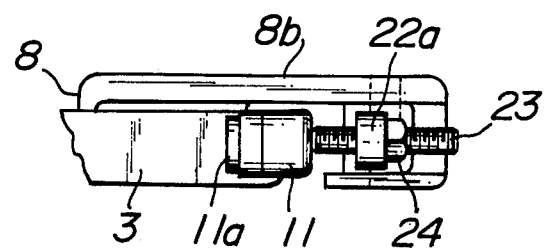
FIG_8

BRAKE FOR VEHICLES

BACKGROUND OF THE INVENTION

(1) Field of the Invention

The present invention relates to a brake for vehicles, particularly suitable for light vehicles such as bicycles.

(2) Description of the Prior Art

Various brakes for vehicles have been proposed such as expanding drum brakes, contracting band brakes, disc brakes and the like. The expanding drum brake comprises brake shoes adapted to be urged against an inside of a drum, so that the drum is subjected to forces on the side and hence required to have thicker walls having a high strength to support such forces acting upon on one side thereof. As the result, the weight of the drum becomes unavoidably heavier and therefore the brake itself becomes larger. In general, furthermore, such an expanding drum brake is inferior in dissipation of heat caused by the braking action and often cannot be used for a long period of time.

The contracting band brake of the prior art comprises a lining covering substantially all of a drum, so that it is also disadvantageous in dissipation of heat.

The disc brake of the prior art inherently does not have a constuction adapted to cause "self-energizing" action (servo effect). The self-energizing action used herein means the effect that a frictional force between a brake shoe and a rotating drum tends to force the brake shoe against the drum to increase the braking function. As the disc brake does not have such a self-energizing action, a great operating force for braking is required to obtain enough braking force. In order to decrease the great operating force, a brake disc must be larger in diameter which would make the brake larger.

SUMMARY OF THE INVENTION

A primary object of the invention is, therefore, to provide a brake for vehicles which eliminates the above disadvantages of the various kinds of brakes and further improves inherent advantages and provides a sufficient braking force by a slight operating force although the brake itself is small and light weight.

Another object of the invention is to provide an improved brake having good cooling effect resulting from wide surface areas of a drum exposed to the atmosphere as in the disc brake.

The brake for vehicles according to the present invention comprises a brake drum rotating in unison with a wheel of the vehicle, an inner pin fixed to a vehicle body within said brake drum, an inner shoe whose end is rotatably pivotally supported by said inner pin within said brake drum, an arm formed integrally with said inner shoe and extending outwardly beyond said brake drum, and outer pin extending from an end of said arm, an outer shoe rotatably pivotally supported by said outer pin for being brought into contact with an outer periphery of said brake drum, and actuating means for urging said inner and outer shoes toward and away from the brake drum.

BRIEF DECRIPTION OF THE DRAWING

These and other objects of the invention will be seen by reference to the description, taken in connection with the accompanying drawings, in which:

FIG. 7 is a partially cutaway front elevation of a third embodiment of the brake according to the invention; and FIG. 8 is an essential part of the brake as viewed in a direction of an arrow VIII in FIG. 7.

Figure 4:
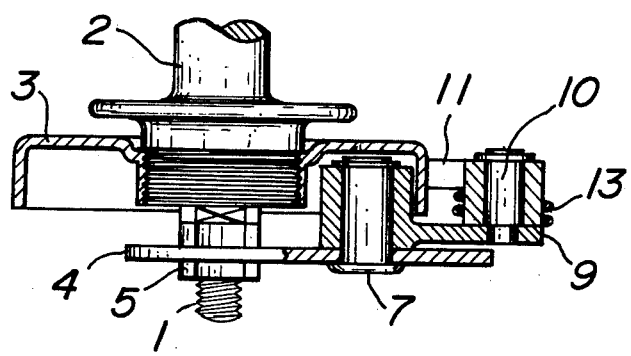
FIG. 4 is a sectional view taken along the lines IV—IV in FIG. 3.

Referring to FIGS. 1-4, the brake for vehicles comprises an axle 1 and a hub 2 for a wheel, which is coaxial with the axle 1 and provided with a brake drum 3 fixed to the hub 2 by means of screws (not shown) as shown in FIG. 4.

According to the present invention, a cover plate 4 having an enlarged portion 4a and an arm 4b extending toward one side thereof is fixed to the axle 1 with the enlarged portion 4a by means of a nut 5 (FIG. 4). The end of the arm 4b is fixed to a vehicle body (not shown) by means of a bolt 6. A pin 7 extends from the cover plate 4 within the brake drum 3 and serves to rotatably pivot a lower end of a brake shoe 8 in the form of an arc within the brake drum 3. An arm 9 integral with the brake shoe 8 extends over the brake drum 3 and is provided at its end with a pin 10 which pivotally supports a lower end of a shoe 11 adapted to be in contact with the outer periphery of the brake drum 3. The shoes 8 and 11 comprise respective linings 8a and 11a. A spring 12 extends between a projection 4c of the cover plate 4 and the upper end of the shoe 8 and serves to force the shoe 8 away from the inner surface of the drum 3. A spring 13 is provided between the arm 9 and shoe 11 to force the shoe 11 away from the outer surface of the drum.

An adjusting screw or bolt 14 whose end is in opposition to the edge of the cover plate 4 is threaddedly engaged in a projection 9a formed integrally with the arm 9. The adjusting screw 14 is rotated and fixed by a lock nut 15 in its adjusted position whereby the clearance between the lining 8a and the inner surface of the drum 3 can be adjusted.

In the embodiment illustrated in FIGS. 1-4, an actuating means for the brake is constructed by securing the end of an inner wire 16 to the shoe 8 by means of a screw or bolt 17 and fixing an outer adaptor 18 to the shoe 11 by means of a nut 19.

Figure 5:
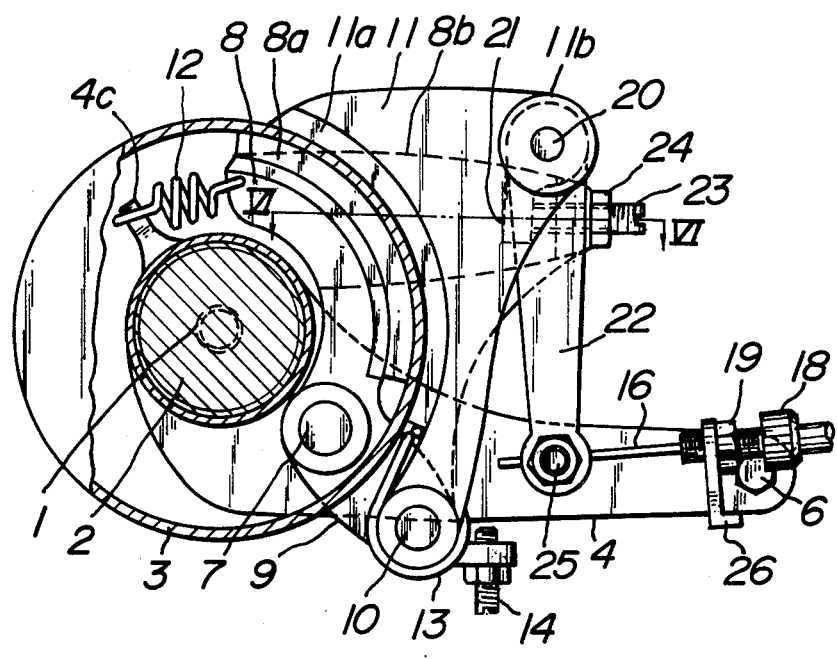
FIG. 5 is a partially cutaway front elevation of a second embodiment of the brake according to the invention.
Figure 6:
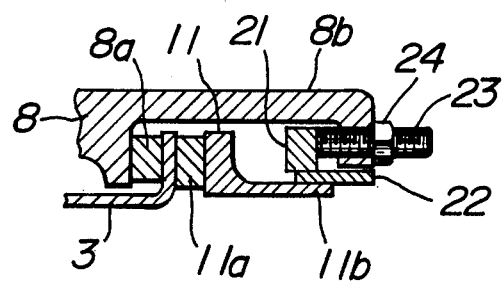
FIG. 6 is a sectional view taken along the line VI—VI in FIG. 5.

FIGS. 5 and 6 illustrate the other embodiment of the invention, wherein an actuating means for the brake is provided with a toggle joint. In this case, the shoe 8 is formed integrally with an arm 8b projecting outwardly over the drum 3, and the shoe 11 is provided with a projection 11b extending over the arm 8b. The projection 11b is provided at its end with a pin 20 which pivotally supports a lever 22 having an extending piece 21 integral therewith. An adjusting screw or bolt 23 is threaddedly engaged in the end of the arm 8b, which is in opposition to the extending piece 21 and adapted to be fixed in position by a lock nut 24. Accordingly, the clearance between the drum 3 and the lining 11a is adjustable to a suitable value by adjusting the adjusting screw 23. The end of the inner wire 16 is fixed to the end of the lever 22 by means of a screw 25. A bracket 26 together with the cover plate 4 is fixed to the vehicle body (not shown) by means of the bolt 6. The outer adaptor 18 is fixed to the bracket 26 by means of the lock nut 19.

Referring to FIGS. 7 and 8 illustrating another embodiment of the invention using the other toggle joint, wherein an arm 8b integral with the shoe 8 extends outwardly beyond the drum 3 and is provided at its extreme end with a pin 20 which pivotally supports a lever 22 having at its upper end an extending piece 22a into which is screwed an adjusting screw or bolt 23 whose end is in opposition to the upper end of the shoe 11. The adjusting screw 23 is fixed by the lock nut 24. The clearance between the lining 11a and the drum 3 is therefore adjustable by means of the adjusting screw 23 adapted to be fixed in adjusted position by the lock nut 24. The inner wire 16 is fixed to the lower end of the lever 22 by means of the screw 25. The bracket 26 together with the cover plate 4 is fixed to the vehicle body (not shown) by means of the bolt 6. The outer adaptor 18 is fixed to the bracket 26 by means of the lock nut 19.

The brake system constructed as above described operates as follows.

Figure 1:
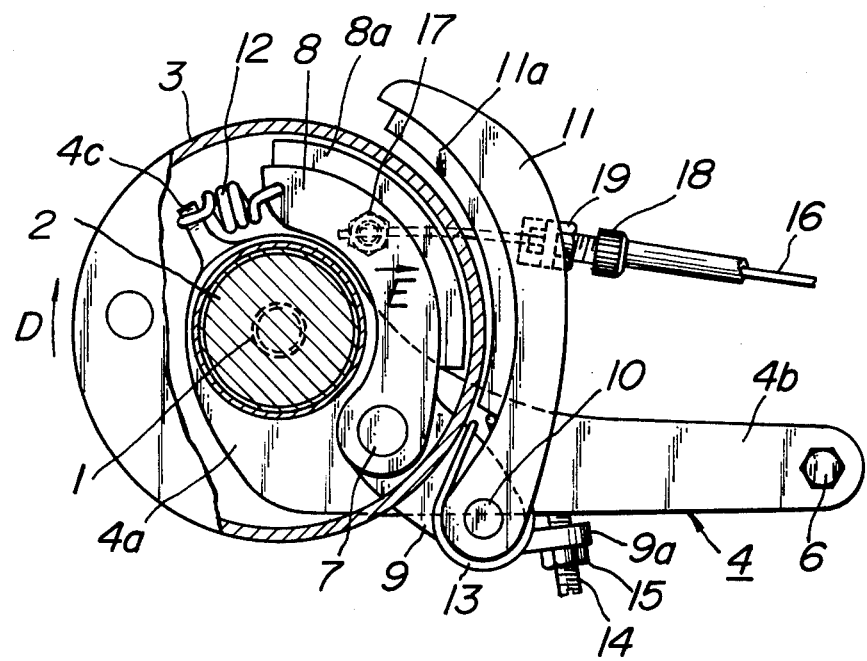
FIG. 1 is a partially cutaway front elevation of a first embodiment of the brake under a rest condition according to the invention.
Figure 2:
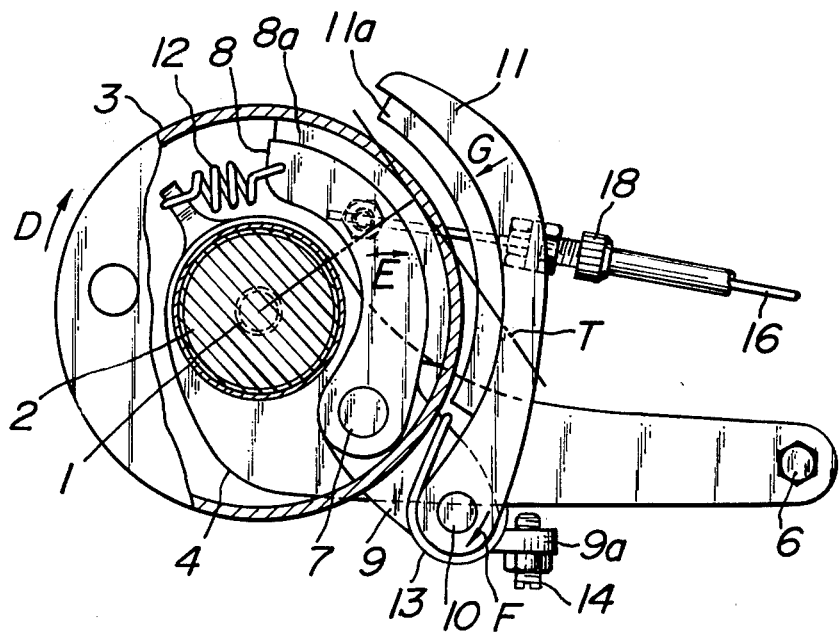
FIG. 2 is a front elevation similar to FIG. 1 showing an intermediate position to an operating position.
Figure 3:
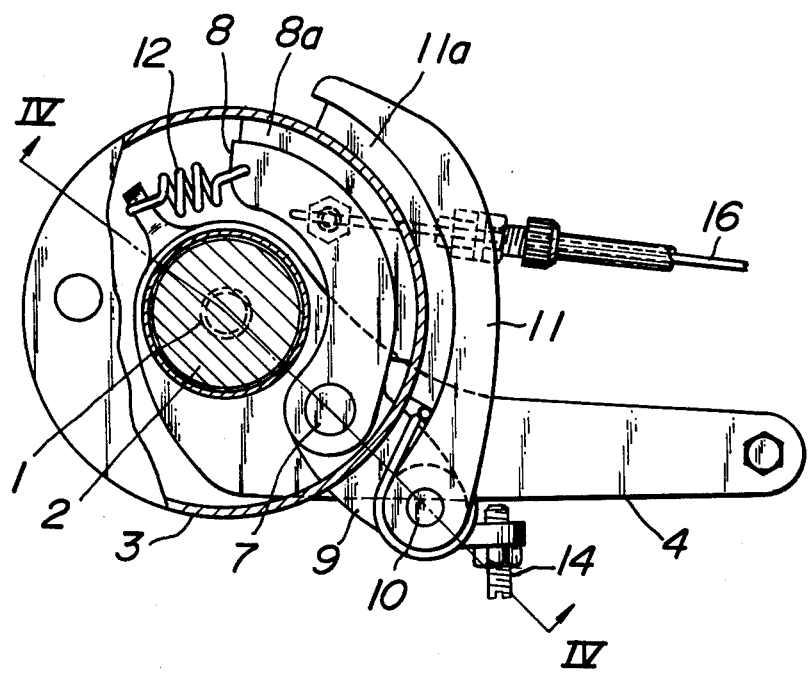
FIG. 3 is a front elevation similar to FIG. 1 showing an operating or braking position.

Referring to FIG. 1, assuming that the drum 3 is rotated in a normal direction of an arrow D, when an operating force is applied to the inner wire 16, the shoe 8 is pivotally moved about the pin 7 in a direction of an arrow E from the condition in FIG. 1 so that in FIG. 2 and the arm 9 integral with the shoe 8 is moved in a direction of an arrow F in FIG. 2 simultaneously. As the result, the shoe 11 and the lining 11a fixed thereto are also moved in the direction of the arrow F, and are simultaneously rotated about the pin 10 in a direction of an arrow G by the operating force acting upon the inner wire 16 from the condition in FIG. 2 to that of FIG. 3. As the pin 7 pivotally supporting the shoe 8 is not on a line T (FIG. 2) which is a tangent to the inner surface of the drum 3 at the center of the lining 8a, the rotation of the drum 3 in the direction of the arrow D tends to urge the shoe 8 and lining 8a toward the inner surface of the drum, which tendency is referred to as "servo" effect or "self-energizing" action. Accordingly, the lining 8a is subjected to the braking action resulting from the self-energizing action in addition to the wire operating force. Similarly, the lining 11a fixed to the shoe 11 pivotally supported by the pin 10 is also subjected to the braking action resulting from a self-energizing action. With the arrangement according to the invention, a resultant force of the braking force acting upon the lining 11a resulting from the wire operating force and the self-energizing effect of the lining 11a acts on the pin 10 in the direction of the arrow F. As the pin 10 is provided in the arm 9 integral with the shoe 8, the resultant braking force of the lining 11a urges the lining 8a in the direction of the arrow E against the inside of the drum 3. Thus when the operating force is applied to the inner wire 16, the linings 8a and 11a are subjected to the braking forces resulting from the wire operating force and the self-energizing action (servo effect), and as described the lining 8a is subjected to the further braking force resulting from the resultant braking force of the lining 11a in the same manner as the operating force to increase the braking force acting upon the lining 8a. In this manner, with the arrangement according to the present invention, a slight operating force is sufficient to provide an enough braking force because of the braking forces acting upon the pair of linings 8a and 11a in opposition to each other and embracing the drum 3 therebetween by the operating force and further braking force acting upon the lining 8a resulting from the braking force of the lining 11a acting as if it were an operating force. As the pair of linings 8a and 11a are substantially in opposition to each other on both sides of the wall of the drum 3, the thickness of the wall of the drum 3 can be thinner than that of the prior art having linings urging a drum on one side thereof or inside as the expanding drum brake. Therefore, it is possible according to the present invention to decrease the weight of the brake drum and hence all the weight of the brake system.

According to the present invention, the part of the drum 3 is embraced by a pair of linings 8a and 11a, so that the surface areas of the drum covered by the linings are relatively small and therefore exposed areas of the drum are relatively large which serve to cool the drum effectively. Accordingly, the brake according to the present invention can be used for a long period of time because of the effective cooling of the drum.

Referring to FIGS. 5 and 6, when an operating force is applied to the inner wire 16, the lever 22 is rotated about the pin 20 and then the extending piece 21 strikes the adjusting bolt 23 to urge the arm 8b integral with the shoe 8 and lining 8a against the inner surface of the drum 3. On the other hand, the reaction force of the lining 8a urged against the drum 3 acts upon the extending piece 21 to force the shoe 11 and the lining 11a against the outer surface of the drum 3 about the pivot pin 20.

Referring to FIGS. 7 and 8, when an operating force is applied to the inner wire 16, the lever 22 is pulled to urge the arm 8b integral with the shoe 8 and lining 8a against the inner surface of the drum 3. As a reaction of this braking action, the extending piece 22a integral with the lever 22 is rotated about the pin 20, with the result that the adjusting bolt 23 forces the shoe 11 and lining 11a against the outer surface of the drum 3.

As can be seen from the above description, according to the invention the braking force can be considerably increased by incorporating the toggle joint utilizing a cam or lever in the brake system for helping the direct operating force by a wire. Accordingly, the brake with such a toggle joint performs a sufficient braking operation only by a slight wire operating force. Therefore, the brake according to the invention provides sufficient brake forces to ensure the safe and positive operation for light vehicles, particularly lady's and child's bicycles whose riders are weak in grasping power.

According to the invention there is an additional advantage in that when an adjusting bolt is provided in the lever connected to the inner wire, the space between the drum and lining can be adjusted within the wide ranges in the event that the lining is worn.

While preferred embodiments of the invention have been described, variations thereto will occur to those skilled in the art within the scope of the present inventive concepts which are delineated by the following claims.

What is claimed is:

1. A brake for vehicles comprising a brake drum rotating in unison with a wheel of the vehicle, an inner pin fixed to a vehicle body within said brake drum, an inner shoe whose end is rotatably pivotally supported by said inner pin within said brake drum, a first arm formed integrally with said inner shoe and extending outwardly beyond said brake drum, an outer pin extending from an end of said first arm, an outer shoe rotatably pivotally supported by said outer pin for being brought into contact with an outer periphery of said brake drum, and actuating means for urging said inner and outer shoes toward and away from the brake drum, wherein said actuating means consists of an actuating wire having its one end connected to said inner shoe and an outer adapter connected to said outer shoe and springs for urging said inner and outer shoes away from said brake drum.

2. A brake as set forth in claim 1, wherein said first arm is provided with an adjusting screw threaddedly engaged therewith and whose end is in opposition to a member fixed to said vehicle body, thereby adjusting a clearance between said inner shoe and the brake drum.

3. A brake for vehicles comprising a brake drum rotating in unison with a wheel of the vehicle, an inner pin fixed to a vehicle body within said brake drum, an inner shoe whose end is rotatably pivotally supported by said inner pin within said brake drum, a first arm formed integrally with said inner shoe and extending outwardly beyond said brake drum, an outer pin extending from an end of said first arm, an outer shoe rotatably pivotally supported by said outer pin for being brought into contact with an outer periphery of said brake drum, and actuating means for urging said inner and outer shoes toward and away from the brake drum, wherein said actuating means is provided with a toggle joint which comprises a second arm formed integral with said inner shoe and projecting outwardly over said drum, a projection extending from said outer shoe, and a lever having an extending piece and pivotally supported at its one end by a pin provided on said projection of said outer shoe, said second arm provided with an adjusting screw threaddedly fitted therein, said screw being in opposition to said extending piece, and the other end of said lever being connected to an actuating wire, thereby enabling a clearance between said drum and said outer shoe to be adjusted by adjusting said adjusting screw.

4. A brake as set forth in claim 3, wherein said first arm is provided with an adjusting screw threaddedly engaged therewith and whose end is in opposition to a member fixed to said vehicle body, thereby adjusting a clearance between said inner shoe and the brake drum.

5. The brake as set forth in claim 3, wherein the actuating means also comprises springs for urging said inner and outer shoes away from said brake drum.

6. The brake as set forth in claim 4, wherein the actuating means also comprises springs for urging said inner and outer shoes away from said brake drum.

7. A brake for vehicles comprising a brake drum rotating in unison with a wheel of the vehicle, an inner pin fixed to a vehicle body within said brake drum, an inner shoe whose end is ratatably pivotally supported by said inner pin within said brake drum, a first arm formed integrally with said inner shoe and extending outwardly beyond said brake drum, an outer pin extending from an end of said first arm, an outer shoe rotatably pivotally supported by said outer pin for being brought into contact with an outer periphery of said brake drum, and actuating means for urging said inner and outer shoes toward and away from the brake drum, wherein said actuating means is provided with a toggle joint which comprises a second arm formed integrally with said inner shoe and projecting outwardly over said drum and provided at its extreme end with another pin, and a lever whose one end is pivotally supported by said another pin and has an extending piece provided with an adjusting screw threaddedly fitted therein, said adjusting scew being in opposition to said outer shoe, and the other end of said lever being connected to the inner wire, thereby enabling a clearance between said drum and said outer shoe to be adjusted by adjusting screw.

8. A brake as set forth in claim 7, wherein said first arm is provided with an adjusting screw threaddedly engaged therewith and whose end is in opposition to a member fixed to said vehicle body, thereby adjusting a clearance between said inner shoe and the brake drum.

9. The brake as set forth in claim 7, wherein the actuating means also comprises springs for urging said inner and outer shoes away from said brake drum.

10. The brake as set forth in claim 8, wherein the actuating means also comprises springs for urging said inner and outer shoes away from said brake drum.

* * * * *